United States Patent
Eckstein et al.

[15] 3,637,068
[45] Jan. 25, 1972

[54] ROTARY CONVEYOR

[72] Inventors: Walter Eckstein; Ferdinand Gah, both of Munich, Germany

[73] Assignee: Metzeler Aktiengesellschaft, Munich, Germany

[22] Filed: Mar. 10, 1970

[21] Appl. No.: 22,741

[30] Foreign Application Priority Data

Mar. 13, 1969 Germany.................P 19 12 858.6

[52] U.S. Cl..................................................198/211
[51] Int. Cl...................................................B65g 29/00
[58] Field of Search.................198/25, 103, 153, 33 AD, 34, 198/211, 209

[56] References Cited

UNITED STATES PATENTS 3,288,270  11/1966  Bunting.................198/103
2,824,675  2/1958  Pepitone.................198/153

Primary Examiner—Richard E. Aegerter
Attorney—Michael S. Striker

[57] ABSTRACT

A rotary wheel has a hub mounted for rotation about an axis and a plurality of circumferentially distributed wall portions which extend from the hub at least substantially radially of the axis and defining a plurality of cells each having a radially outwardly directed opening. A bag is mounted in each of the cells, consisting of elastomeric material, and has an open side facing the associated opening so that material which is introduced into the bag through the opening when the latter faces substantially upwardly with reference to the substantially horizontal axis of rotation, the material will issue from the open side and through the opening when the wheel has been displaced to a position where the opening faces downwardly.

6 Claims, 2 Drawing Figures

PATENTED JAN 25 1972   3,637,068

INVENTOR
WALTER ECKSTEIN
FERDINAND GAH
BY
ATTORNEY

ROTARY CONVEYOR

BACKGROUND OF THE INVENTION

The present invention relates generally to a rotary conveyor, and more particularly to a so-called cell wheel type of rotary conveyor.

Such conveyors are known as supply or dosing arrangements in many applications, for instance for supplying particulate materials, such as pulverulent or granular masses, especially carbon, to feed screws or the like. However, they also have wide application for other purposes. In any case, it is well known that the known constructions suffer from a certain highly objectionable disadvantage. Reference is here to the fact that if such conveyors are used for advancing dust-forming moisture-susceptible masses, for instance granular carbon, the material being transported tends to adhere to the walls bounding the respective cells of the conveyor and to form thereon thick layers whose thickness in fact increases until the cross-sectional area of the respective cell is largely filled and finally each cell has only a small volumetric content. This is evidently undesirable, particularly if the conveyor is used as a dosing device or metering device which is intended to supply predetermined and constant quantities of material which are determined by the volumetric content of the respective cells. For this reason, it is necessary that known rotary conveyors of the type under discussion be constantly supervised to assure that the quantity of material advanced by each cell remains constant, for which purposes it is of course necessary to remove from the surfaces bounding the respective cells such material that tends to adhere thereto and deform thereon the aforementioned layer. This is of course a particular disadvantage which requires additional labor and increases the expensive involved in operation of such conveyors, aside from the fact that the conveyor must of course be stopped every time it is to be inspected and material to be removed which adheres to the surfaces bounding the respective cells. Operation of such rotary conveyors—which inherently is intended to be continuous—thus becomes discontinuous with the attendant disadvantages which will be evident.

SUMMARY OF THE INVENTION

It is, accordingly, an object of the present invention to overcome the aforementioned disadvantages.

More particularly, it is an object of the invention to provide a rotary conveyor of the type under discussion which is not possessed of these drawbacks.

A further object of the invention is to provide such a rotary conveyor which is capable of truly continuous operation without requiring supervision and cleaning.

In pursuance of the above objects, and other which will become apparent hereafter, the invention provides for a rotary conveyor which, briefly stated, comprises a rotary member having a hub mounted for rotation about an axis, and a plurality of circumferentially distributed wall portions extending from this hub at least substantially radially of the axis and defining a plurality of cells each having a radially outwardly directed opening. Bag means of a flexible substance is mounted in each of these cells and has an open side facing the associated openings, so that material introduced into the bag means through this opening in one angular position of the member issues from this open side and through the opening in another, circumferentially displaced position of the member.

The axis of rotation will normally be at lest substantially horizontal in this type of construction and with the particular use to which it is to be put, and the material of which the bag means is composed is advantageously an elastomeric material, of natural synthetic rubber or a suitable synthetic plastic. position points It is also advantageous to provide the bag means at that side thereof which faces away from the open side and towards the axis of rotation with the weight, so that when the open side faces upwardly with respect to a horizontal axis or rotation, the bag means will be held opened whereas the bag means will be flexed in direction towards the open side and material contained therein forcibly ejected by such flexing as the respective cell moves to a position in which the open side points downwardly.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
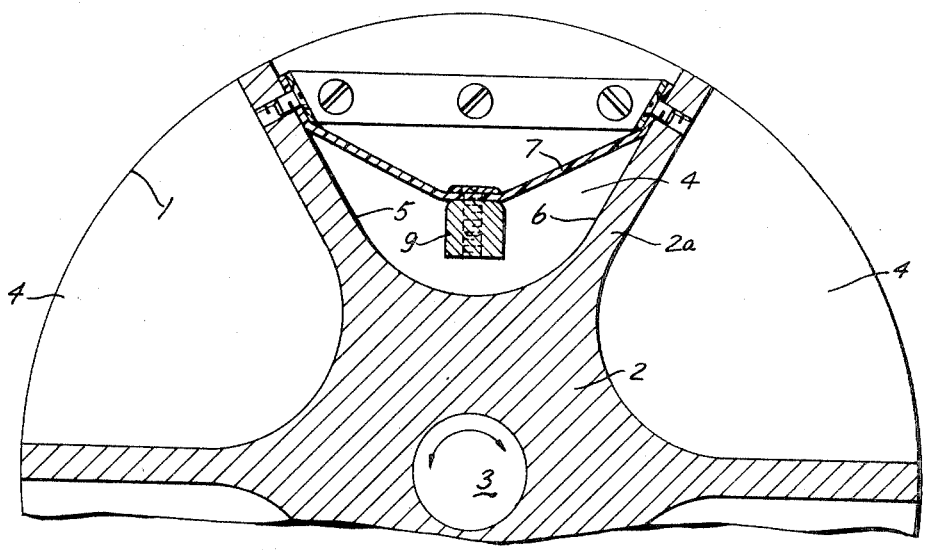
FIG. 1 is a fragmentary sectional elevation of a conveyor according to the present invention, with a section taken in a plane normal to the axis of rotation.

Discussing now the embodiments illustrated in detail, it will be seen that reference numeral 1 identifies generally the interior space—which is of cylindrical configuration—accommodated within an outer cylindrical jacket such as is normally provided in the type of construction under discussion. Although the view in FIGS. 1 and 2 is fragmentary, it will be appreciated that space 1 is of circular outline.

Mounted for rotation about the axis or shaft 3—which axis is normally or at least substantially horizontal—is a cellular rotary member or wheel 2, which is secured in known manner to the shaft 3 and rotates therewith. The member 2 is provided with a plurality of circumferentially distributed wall portions extending at least substantially radially of the axis of rotation defined by the shaft 3—the hub portion of the member 2 is illustrated but requires no discussion—and each two circumferentially consecutive ones of these wall portions 2a define with one another a cell 4 bounded by the lateral surface 5, 6 (see FIG. 1), and having an opening facing radially away from the shaft 3. This could also be stated differently by saying that the circumferentially extending radial edge face of member 2 is provided with cavities whose open sides face radially and which are bounded by respective sidewalls.

Figure 2:
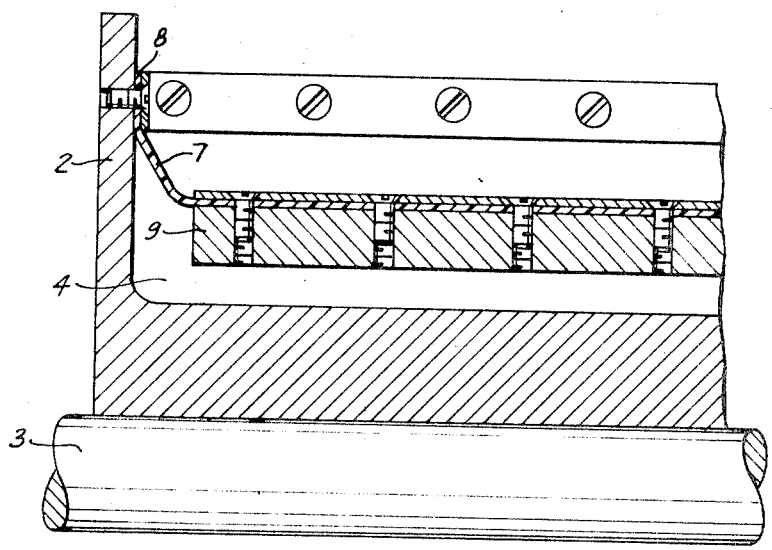
FIG. 2 is a fragmentary section through the embodiment of FIG. 1, taken on a second plane normal to the plane of the section in FIG. 1.

Mounted in each cell 4 is bag means 7, but for the sake of convenience, only one has been illustrated in FIGS. 1 and 2. This bag means 7 is in form of bags consisting of elastomeric material, such as rubber or synthetic plastic material, which is advantageously reinforced with one or more layers of reinforcing material. Bag means 7 is so arranged that an open side thereof faces the radially directed opening of the respective cell 4 (see FIG. 1) with the marginal portions bounding the open side of the bag means 7 being secured to the sidewalls or surfaces 5 and 6 or the respective cell in the region of the opening of the latter by means of suitable and well-known securing means, such as screws, bolts, rivets, or any other material. Any means as screws or the like (as illustrated) should be countersunk so that nothing projects above the inner surface of the bag means which could cause material to become accumulated would be conveyed in the bag means 7.

It is advantageous, and illustrated in the drawing, to provide a weight 9 which is secured to the bag means 7 at a side thereof facing away from the respective open side, so as to draw the material from the bag means 7 tight when the respective cell 4 faces in upwardly or in at least substantially upwardly direction as shown in FIG. 1. The weight 9 can be secured to the bag means 7 in suitable manner, for instance again by means of screws (compare FIGS. 1 and 2), if necessary with a reinforcing strip or the like, which is also illustrated in FIGS. 1 and 2.

In operation of a device of the type illustrated in FIGS. 1 and 2, material to be conveyed will normally be dispensed from a nonillustrated supply device into that particular cell 4 which faces upwardly as illustrated in FIG. 1. In the illustrated embodiment, weight 9 tightens the material of the bag means 7 and holds the latter fully opened, as shown. As pulverulent, granular or analogous material is introduced into the bag means 7, the latter can therefore be filled to its full volumetric capacity.

Conveyors of the type illustrated rotate about the axis defined by the shaft 3 either continuously and relatively slowly, or stepwise. In any case, assuming the illustrated bag means 7 to have been filled to the desired extent with pulverulent, granular or analogous material, the conveyor will turn either in clockwise or in counterclockwise direction about the axis defined by the shaft 3. Material will be prevented from issuing from the bag means 7 by the presence of the outer circumferential wall of the construction and may for instance by provided with only two apertures, namely an upwardly directed aperture through which the material enters, and a downwardly directed aperture which may be located diametrically opposite the upwardly directed aperture and through which the material issues Of course, the outer wall could be omitted, or the apertures could be located otherwise In any case, assuming that the two just-mentioned apertures are provided, no material will issue from the illustrated bag means 7 until the cell and the associated bag means move into registry with the nonillustrated downwardly directed aperture in the outer circumferential wall. In this position, the weight 9 flexes the material of the bag means 7 in downward direction, that is towards the open side of the bag means 7, and expels the material in the bag means 7 through the opening of the cell 4 and through whatever opening is provided in the outer circumferential wall. It will be appreciated that the weight 9 can be replaced with other means, for instance pneumatic or hydraulic means capable of effecting the desired flexing. The salient point here is the constant elastic flexing of the bag means 7 which constantly dislodges any material attempting to adhere to the inner surface of the bag means 7 so that the entire material introduced into the bag means 7 at one location will be reliably ejected at another location. This eliminates the need for constant control of the conveyor and for frequent cleaning thereof, so that the conveyor will be capable of continuous operation without requiring supervision or attendance, and will always reliably produce the predetermined exact amount of material which has been introduced into it at one location and which is to be conveyed to and ejected at another location. Consequently, the expense of operating such a rotary conveyor is significantly decreased.

It will be understood that each of the elements described above, or two or more together, may also fined a useful application in other types of constructions differing from the types described above.

While the invention has been illustrated and described as embodied in a rotary conveyor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A rotary conveyor, comprising a rotary member having a circumferentially extending radially directed edge face; a plurality of cavities in said edge face each having a radially outwardly directed first open side and being bounded by a plurality of sidewalls; bag means of a flexible substance mounted in each of said cavities connected to all of said sidewalls thereof and having a second open side facing the associated first open side so that material introduced into such bag means through said open sides in one angular position of said rotary member issues from said open sides in another, circumferentially displaced angular position of said rotary member; and connecting means for connecting each of said bag means to all sidewalls of the respectively associated cavity.

2. A rotary conveyor as defined in claim 1, wherein said axis is at least substantially horizontal, and material issues from said bag means under the influence of gravity in response to said member assuming a requisite angular position.

3. A rotary conveyor as defined in claim 2, wherein said flexible substance is an elastomeric substance.

4. A rotary conveyor as defined in claim 2, said material being particulate material having a tendency to adhere to said bag means; and wherein said flexible substance is an elastomeric substance; and further comprising flexing means for effecting flexing of said bag means in response to movement of said member towards said other position to thereby dislodge said particulate material from said bag means.

5. A rotary conveyor as defined in claim 4, said flexing means comprising weight means carried by said bag means at a side of the latter facing away from said open sides and toward said axis.

6. A rotary conveyor as defined in claim 3, said bag means having marginal portions bounding said second open side; and further comprising connecting means connecting said marginal portions to said sidewalls.

* * * * *